US009223984B2

(12) United States Patent
Guarnieri et al.

(10) Patent No.: US 9,223,984 B2
(45) Date of Patent: *Dec. 29, 2015

(54) AFTER-THE-FACT CONFIGURATION OF STATIC ANALYSIS TOOLS ABLE TO REDUCE USER BURDEN

(71) Applicant: International Business Machines Corporation, Armonk, NY (US)

(72) Inventors: Salvatore A. Guarnieri, New York, NY (US); Marco Pistoia, Amawalk, NY (US); Omer Tripp, Har-Adar (IL)

(73) Assignee: GlobalFoundries Inc., Grand Cayman (KY)

( * ) Notice: Subject to any disclaimer, the term of this patent is extended or adjusted under 35 U.S.C. 154(b) by 7 days.

This patent is subject to a terminal disclaimer.

(21) Appl. No.: 14/024,761

(22) Filed: Sep. 12, 2013

(65) Prior Publication Data

US 2014/0373159 A1    Dec. 18, 2014

Related U.S. Application Data

(63) Continuation of application No. 13/917,916, filed on Jun. 14, 2013.

(51) Int. Cl.
  *G06F 11/00*    (2006.01)
  *G06F 21/57*    (2013.01)
(52) U.S. Cl.
  CPC .................................. *G06F 21/577* (2013.01)
(58) Field of Classification Search
  CPC ........ G06F 21/50; G06F 21/562; H04L 63/14
  USPC ................ 726/23–25; 713/185–187; 717/131
  See application file for complete search history.

(56) References Cited

U.S. PATENT DOCUMENTS

| 7,284,274 | B1 | 10/2007 | Walls et al. | |
|---|---|---|---|---|
| 7,849,509 | B2 | 12/2010 | Venkatapathy | |
| 7,975,306 | B2 | 7/2011 | Chess et al. | |
| 8,171,554 | B2 * | 5/2012 | Elovici et al. | ........ H04L 12/2602 713/151 |
| 8,528,093 | B1 * | 9/2013 | Kureha et al. | ................... 726/25 |

(Continued)

OTHER PUBLICATIONS

A Moser, Limits of Static Analysis for Malware Detection, Dec. 2007, IEEE, vol. 10, pp. 421-430.*

(Continued)

*Primary Examiner* — Dede Zecher
*Assistant Examiner* — Viral Lakhia
(74) *Attorney, Agent, or Firm* — Harrington & Smith

(57) ABSTRACT

A method includes mapping, based on a first mapping from possible security findings to possible configuration-related sources of imprecision, actual security findings from a static analysis of a program to corresponding configuration-related sources of imprecision, the mapping of the actual security findings creating a second mapping. A user is requested to configure selected ones of the configuration-related sources of imprecision from the second mapping. Responsive to a user updating configuration corresponding to the selected ones of the configuration-related sources of imprecision, security analysis results are updated for the static analysis of the program at least by determining whether one or more security findings from the security analysis results are no longer considered to be vulnerable based on the updated configuration by the user. The updated security analysis results are output. Apparatus and program products are also disclosed.

17 Claims, 4 Drawing Sheets

(56) References Cited

U.S. PATENT DOCUMENTS

| | | | |
|---|---|---|---|
| 8,661,547 B1 | 2/2014 | Kononov et al. | |
| 8,789,200 B2 * | 7/2014 | An et al. | 726/26 |
| 8,819,820 B2 * | 8/2014 | Milman et al. | 726/22 |
| 2004/0243881 A1 | 12/2004 | Wang et al. | |
| 2006/0225124 A1 | 10/2006 | Kolawa | |
| 2007/0240138 A1 | 10/2007 | Chess | |
| 2008/0060077 A1 | 3/2008 | Cowan | |
| 2008/0092237 A1 * | 4/2008 | Yoon et al. | 726/25 |
| 2008/0250493 A1 | 10/2008 | Bassani et al. | |
| 2008/0276228 A1 | 11/2008 | Sreedhar | |
| 2009/0300764 A1 | 12/2009 | Freeman | |
| 2011/0126288 A1 * | 5/2011 | Schloegel et al. | G06F 21/577 726/25 |
| 2011/0173693 A1 | 7/2011 | Wysopal et al. | |
| 2012/0144491 A1 | 6/2012 | Pistoia | |
| 2012/0159624 A1 * | 6/2012 | Konig | 726/23 |
| 2012/0317143 A1 | 12/2012 | Pistoia | |
| 2013/0086689 A1 | 4/2013 | Laverdiere-Papineau | |
| 2013/0133069 A1 * | 5/2013 | Nazarov | G06F 21/56 726/23 |
| 2013/0226539 A1 * | 8/2013 | Shaw | 703/2 |
| 2013/0312092 A1 * | 11/2013 | Parker | H04L 63/1408 726/22 |

OTHER PUBLICATIONS

Ayewah, N. et al.; "Evaluating Static Analysis Defect Warnings on Production Software"; Jun. 13, 2007, whole document (7 pp.); Association for Computing Machinery; San Diego, California, USA.

Zitser, M. et al.; "Testing Static Analysis Tools using Exploitable Buffer Overflows from Open Source Code"; Oct. 31, 2004; whole document (10 pp.); Association for Computing Machinery; Newport Beach, California, USA.

* cited by examiner

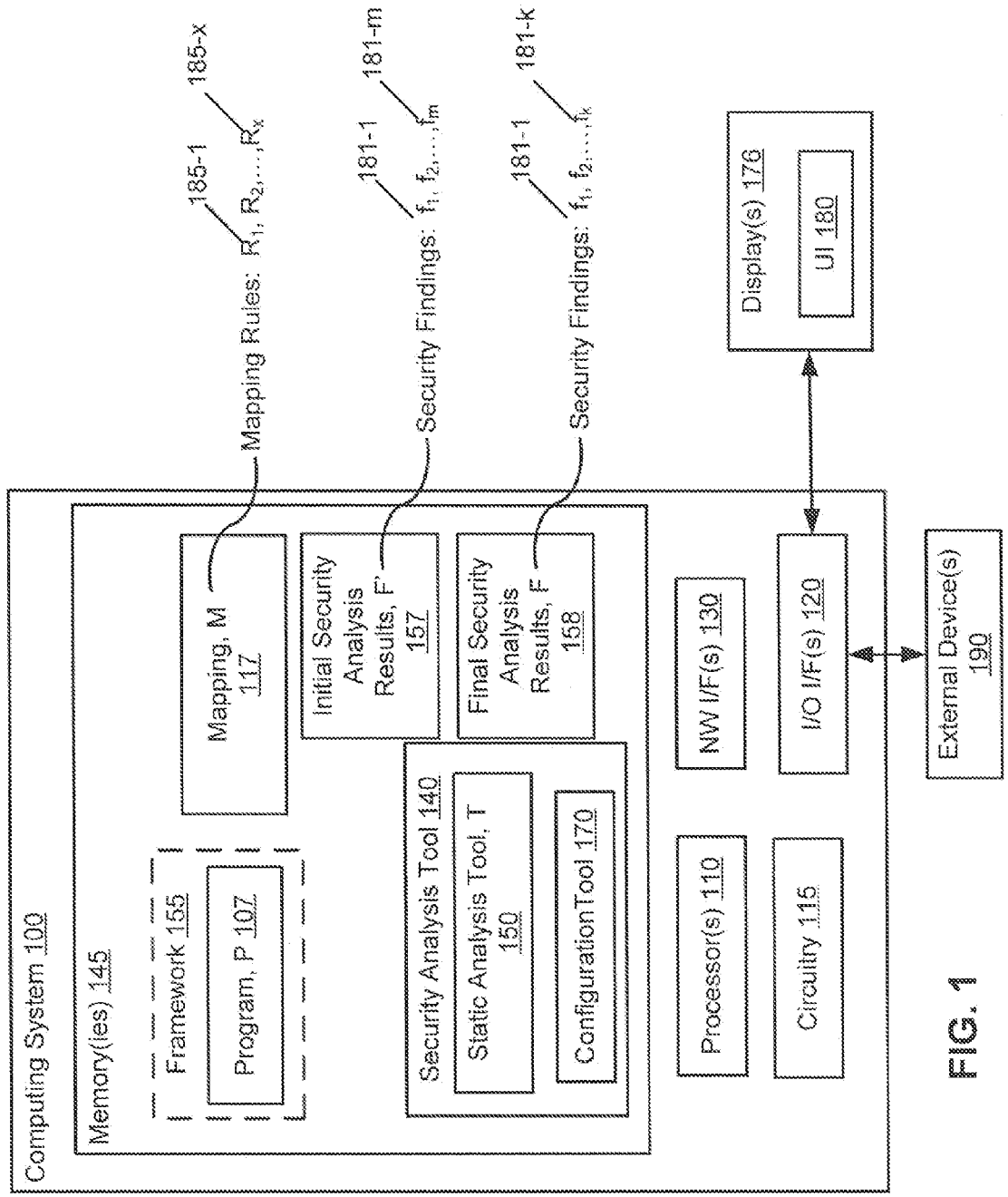

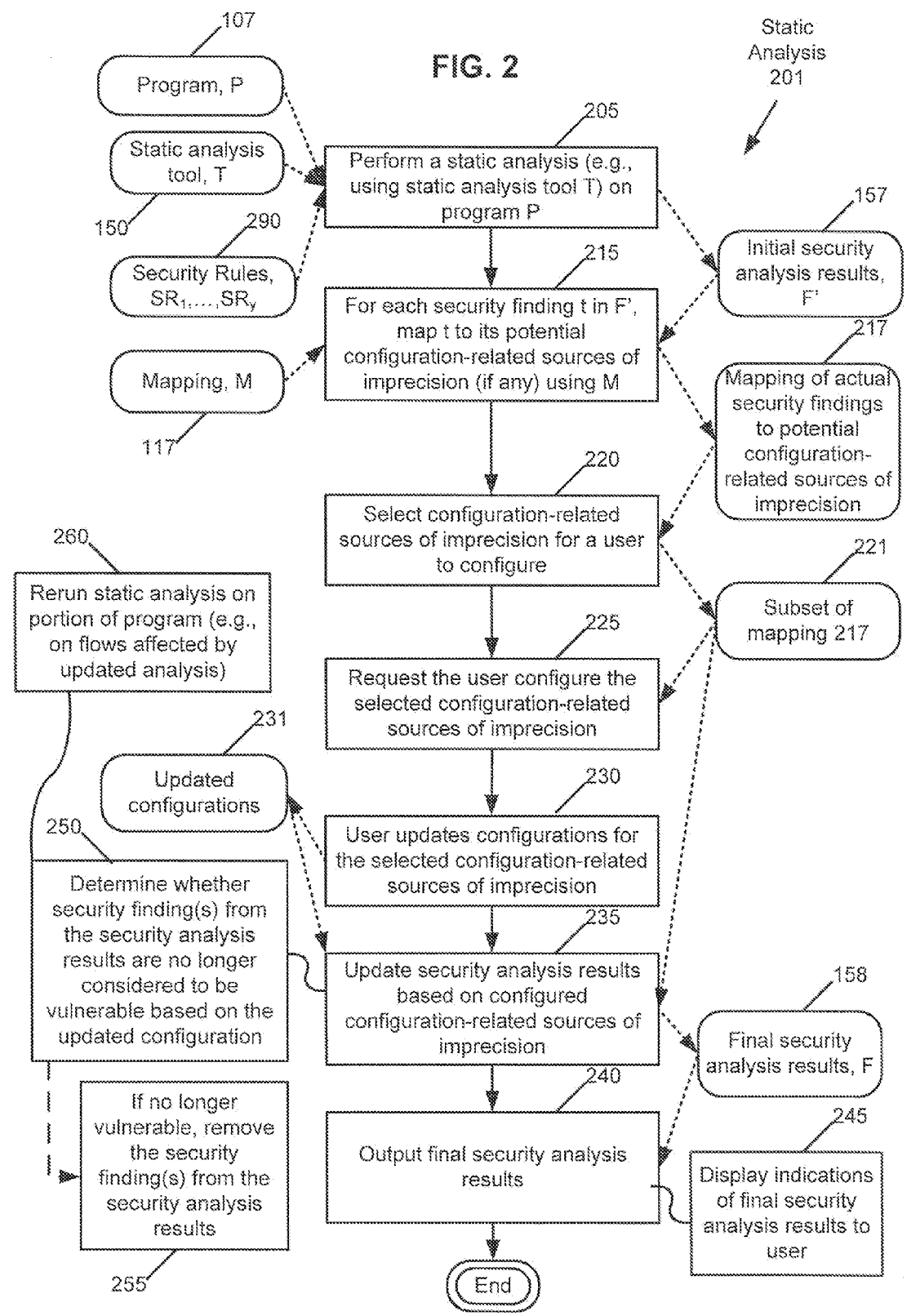

185-1: If a vulnerable flow is discovered along a path having a call to a method with a sanitizer-like signature, then a possible configuration-related source of imprecision is the method.

185-2: If a vulnerability of type "log forging" is discovered and the source statement is a "getParameter" call, then a possible configuration-related source of imprecision is the target web container(s).

185-3: If a vulnerable flow is discovered within framework code, then a possible configuration-related source of imprecision is the framework configuration.

FIG. 3

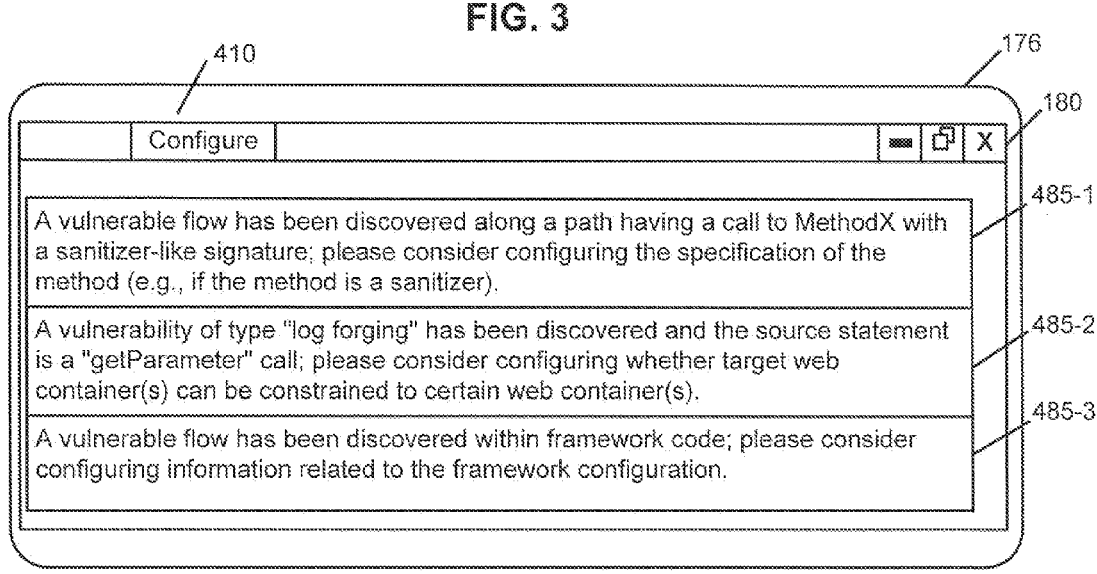

FIG. 4

585-1: User configures specification of the method with the sanitizer-like signature to indicate the method is a sanitizer.

585-2: User constrains the web container(s) to specific container(s).

585-3: User configures specification of framework validators installed by user to update framework configuration.

FIG. 5

AFTER-THE-FACT CONFIGURATION OF STATIC ANALYSIS TOOLS ABLE TO REDUCE USER BURDEN

CROSS-REFERENCE TO RELATED APPLICATIONS

This patent application is a continuation of U.S. patent application Ser. No. 13/917,916, filed on Jun. 14, 2013, which is incorporated herein by reference in its entirety to provide continuity of disclosure.

BACKGROUND

This invention relates generally to analysis of program code and, more specifically, relates to static analysis of program code.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Static analysis is an analysis that involves examining the code of programs such as Web programs without executing the code of the program. Some type of model is (or, more typically, models are) created of the code of the program, to estimate what would happen when the code actually is executed.

Static security analysis generally takes the form of taint analysis, where the analysis may be parameterized by a set of security rules, each rule being a triple <Src,San,Snk> denoting the following:

1) source statements (Src) reading untrusted user inputs;
2) downgrader statements (San) endorsing untrusted data by either endorsing or sanitizing the untrusted data; and
3) sink statements (Snk) performing security-sensitive operations.

There are a number of techniques for analyzing taint flow from sources to sinks. These techniques also consider whether flow passed through a downgrader (also called an endorser or sanitizer for endorsement or sanitization, respectively) that performs downgrading of the taint. Using such techniques, given security rule r, a flow from a source in $Src_r$ to a sink in $Snk_r$ that does not pass through a downgrader from $San_r$ comprises a potential vulnerability.

Static analysis is a necessity when auditing industry-scale software systems. Such systems are too large and complex to lend themselves to thorough manual review. A key difficulty, however, is that the analysis typically reports an overwhelming number of findings. For example, for a medium-size application, a commercial static security analysis typically reports thousands of issues, if not more.

Thus, it would be beneficial to reduce the number of reported issues.

BRIEF SUMMARY

The following summary is merely intended to be exemplary. The summary is not intended to limit the scope of the claims.

A method includes mapping, based on a first mapping from possible security findings to possible configuration-related sources of imprecision, actual security findings from a static analysis of a program to corresponding configuration-related sources of imprecision, the mapping of the actual security findings creating a second mapping. A user is requested to configure selected ones of the configuration-related sources of imprecision from the second mapping. Responsive to a user updating configuration corresponding to the selected ones of the configuration-related sources of imprecision, security analysis results are updated for the static analysis of the program at least by determining whether one or more security findings from the security analysis results are no longer considered to be vulnerable based on the updated configuration by the user. The updated security analysis results are output. Apparatus and program products are also disclosed.

BRIEF DESCRIPTION OF THE SEVERAL VIEWS OF THE DRAWINGS

FIG. 1 is a block diagram of an example of a system suitable for performing the exemplary embodiments herein;

FIG. 2 is a logic flow diagram for after-the-fact configuration of static analysis tools able to reduce user burden, and illustrates the operation of an exemplary method, a result of execution of computer program instructions embodied on a computer readable memory, and/or functions performed by logic implemented in hardware, in accordance with an exemplary embodiment;

FIG. 3 illustrates three exemplary mapping rules in accordance with exemplary embodiments;

FIG. 4 illustrates a UI and indications on the UI for requesting a user to configure selected configuration-related sources of imprecision, where the indications correspond to the mapping rules in FIG. 3;

FIG. 5 illustrates exemplary actions taken by a user to configure selected configuration-related sources of imprecision, where the actions correspond to the indications shown in FIG. 4.

DETAILED DESCRIPTION

Figure 6:
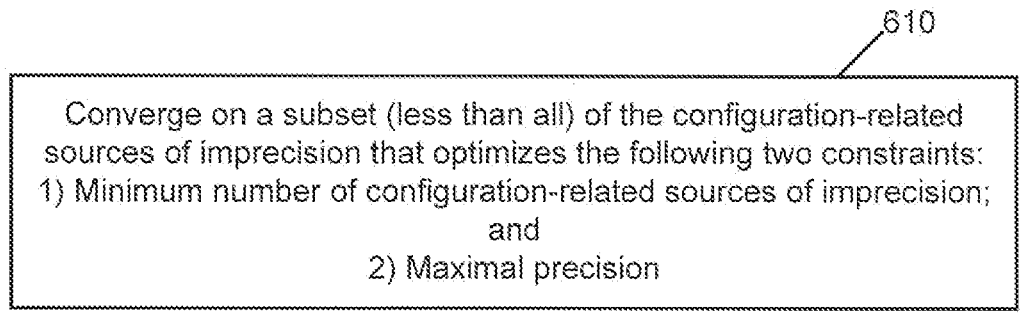
FIGS. 6, 7, and 8 are each examples of operations to select configuration-related sources of imprecision for a user to configure.

As stated above, there are problems with static analyses. Additional description of problems is now presented.

An effective way of improving the precision of the analysis is by configuring the analysis to account for application-specific and/or deployment-specific behaviors. Here are some examples from the area of security analysis of web applications:

Downgrader methods. Some methods in the application scope act as downgraders—i.e., sanitizers or validators—thereby endorsing untrusted information flows. If the user neglects to specify a downgrader in a tool's configuration, then the tool is likely to report false findings. False findings are reported issues where the flow goes through the downgrader, which should mean the flow should not be reported as the flow should be downgraded and no vulnerability should result. In the case of a downgrader not specified as such, though, flows passing through the downgrader would still be marked as vulnerable.

Database (DB) type. In certain reports, the flow either starts or terminates at a backend DB. The security analysis makes the conservative assumption that the backend DB can be of any type. However, knowing the exact type of the DB renders some of the reported issues benign. This is because different DBs treat different characters and substrings in the user query as metacharacters, and thus attacks and corresponding vulnerabilities are based on those different metacharacters.

Web container. Different web containers (e.g., Tomcat, JBoss and Websphere in Java web programming, where Java is a program language and computing platform) filter out or transform different patterns in the incoming request before the request reaches user code. For example, in Tomcat the value of an HTTP (hypertext transfer protocol) parameter cannot contain the "\n\r" substring, which forces line feed, and thus certain kinds of log-forging vulnerability reports are likely to be benign in Tomcat.

Framework configuration. A final example is the configuration provided for software frameworks the application is built atop (e.g., Struts, Spring and JSF, Java server faces). In certain frameworks (e.g. Struts), it is possible to define interceptors that modify/validate input values, thereby rendering false some of the reports by the analysis tool.

In all of the above cases (and many others), the user-provided configuration directly contributes to the precision of the analysis, reducing the number/likelihood of false reports.

An exemplary problem, however, is that extensive configuration of the static analysis tool reduces its usability, as well as the productivity of the user. If the user is required to eagerly specify all the various deployment settings and application-level information that may influence the precision of the analysis, then there is, e.g., (I) a steep learning curve in using the analysis tool, and (ii) a considerable time investment before every scan. Moreover, the user is likely to forget certain configuration items and/or err, if (s)he is expected to configure a large number of settings.

An exemplary improvement described herein is that the tool configuration can happen after the scan, at the point when the tool is already aware of "serious" sources of potential imprecision. This leaves the user to configure only the relevant settings, thereby reducing the amount of required configuration and improving the usability of the tool. For this, the security analysis tool should be able to relate security findings to configuration-related sources of imprecision. For instance, the correctness of a report on a vulnerable flow into a backend database hinges on the type of backend database, and thus the type of backend database in this example is a configuration-related source of imprecision, since the type determines whether the flow actually is or is not vulnerable to a security issue and a user can configure the tool to allow the tool to determine the type of the backend database.

That is, assuming that the static analysis tool is equipped with a mapping from security findings to their potential configuration-related sources of imprecision, these sources can be mitigated via configuration. Here are several examples:

A) If the static analysis tool determines, along a vulnerable path, methods with a sanitizer-like signature (e.g., accepting a string and returning it string), then these methods may indeed be sanitizers, which the user could configure as such. Because the user configures the static analysis tool to apply these methods as sanitizers, then flows previously marked (e.g., in an initial security analysis results) as vulnerable can be determined by the static analysis tool to no longer be vulnerable and removed from the initial security analysis results to create a final security analysis results.

B) If the tool reports a vulnerability that is container specific, such as a log-forging violation starting at a getParameter call, then the correctness of this report depends on the type of web container (as explained above). The user can configure the static analysis tool, e.g., to constrain the applicable web container(s) to particular web container(s), and then flows previously marked (e.g., in the initial security analysis results) as vulnerable can be determined by the static analysis tool to no longer be vulnerable and removed from the initial security analysis results to create the final security analysis results.

C) If the static analysis tool as a result of an analysis on a program reports a vulnerable flow within framework code, then being aware of the framework configuration—and in particular, the framework-level validators installed by the user—could allow the analysis to suppress the finding. An example of this is an SQL (structured query language) injection (SQLi) report, where a framework-level validator ensures that the user input contains only digits (and thus input to a backend database of the user input will not be subject to an SQLi). The user can configure the static analysis tool to determine which methods are framework-level validators and therefore the static analysis tool can use this configuration to remove security findings related to flows that were initially marked as vulnerable but that pass through a framework-level validator.

Additional description of the exemplary embodiments is presented reference to the figures. Referring to FIG. 1, this figure provides an overview of a computing system 100 suitable for use with exemplary embodiments herein. The computing system 100 comprises one or more memories 145, one or more processors 110, one or more I/O interfaces 120, and one or more wired or wireless network interfaces 130. Alternatively or in addition to the one or more processors 110, the computing system 100 may comprise circuitry 115. The computing system 100 is coupled to or includes one or more displays 176 and one or more external device(s) 190. In one example, a program, P, 107 a mapping, M, 117, an initial security analysis results, F', 157, a final security analysis results, F, 158, and a security analysis tool 140 exist in the one or more memories 145. The one or more memories 145 also include a framework 155, of which the program 107 is built atop. The security analysis tool 140 includes a static analysis tool, T, 150 and a configuration tool 170. The security analysis tool 140, in an exemplary embodiment, is implemented computer-readable program code that is executable by the one or more processors 110 to cause the computing system 100 to perform one or more of the operations described herein. In another example, the operations may also be performed, in part or completely, by circuitry 115 that implements logic to carry out the operations. The circuitry 115 may be implemented as part of the one or more processors 110 or may be separate from the one or more processors 110. The processors 110 may be any processing units, such as digital signal processors and/or single-core or multi-core general purpose processors. The circuitry 115 may be any electronic circuit such as an application specific integrated circuit or programmable logic. The memories 145 may comprise non-volatile and/or volatile RAM (random access memory), cache memory, NAND-based flash memory, long term storage (e.g., hard drive), and/or read only memory. The one or more I/O interfaces 120 may include interfaces through which a user may interact with the computing system 100. The display(s) 176 may be a touchscreen, flatscreen, monitor, television, projector, as examples.

A user interacts with the security analysis tool 140 through the UI 180 on the display 176 in an exemplary embodiment or through the network interface(s) 130 in another non-limiting embodiment. The external device(s) 190 enable a user to interact in one exemplary embodiment with the computing system 100 and may include a mouse, trackball, keyboard, and the like. The network interfaces 130 may be wired and/or wireless and may implement a number of protocols, such as cellular or local area network protocols. The elements in computing system 100 may be interconnected through any technology, such as buses, traces on a board, interconnects on semiconductors, and the like.

In this example, the security analysis tool 140 includes a static analysis tool 150 that performs the static analyses operations (e.g., static analysis 201 described below in reference to FIG. 2). As an example, the security analysis tool 140 includes a configuration tool 170 that performs, at least in part, after-the-fact configuration of static analysis tools able to reduce user burden, as described below. It is noted that the separation into static analysis tool 150 and configuration tool 170 is merely exemplary and for ease of description. Instead of this scenario, there could be simply a static analysis tool 150. Furthermore, there does not have to be a security analysis tool 140 (e.g., which could perform other analyses, such as run-time analyses) and a static analysis tool 150; instead, there could be only a static analysis tool 150. Other configurations are also possible.

The mapping, M, 117 includes a number x of mapping rules $R_1$ 185-1 through $R_x$ 185-x. The mapping rules 185 map possible security findings (e.g., in terms of possible security vulnerabilities) to possible configuration-related sources of imprecision. The initial security analysis results, F', 157 includes in security findings $f_1$ 181-1 through $f_m$ 181-m, and the final security analysis results, F, 158 includes k security findings $f_1$ 181-1 through $f_k$ 181-k, where k should be less than m and the reduction in security findings occurs because the configuration tool 170 is able to apply configuration by a user to the static analysis tool 150 in order to remove some of the security findings from the initial security analysis results 157 to create the final security analysis results 158. A typical scenario is that there is only a single security analysis results, and security findings are simply removed from those security analysis results. However, for ease of reference and understanding, two security analysis results 157, 158 are shown in FIG. 1 (and FIG. 2) and described below.

Turning to FIG. 2, this figure is a logic flow diagram for after-the-fact configuration of static analysis tools able to reduce user burden. This figure additionally illustrates the operation of an exemplary method, a result of execution of computer program instructions embodied on a computer readable memory, and/or functions performed by logic implemented in hardware, in accordance with an exemplary embodiment. The blocks in FIG. 2 are assumed to be performed by the computing system 100, under control of the security analysis tool 140. The blocks in FIG. 2 are assumed to be part of a static analysis 201, such that the program 107 is analyzed statically (that is, without execution of the program 107).

In block 205, the computing system 100 performs a static analysis (e.g., using static analysis tool T 150) on program P 107. The inputs include the program P 107, the static analysis tool T 150, and y security rules 290. In an exemplary embodiment, each security rule 290 is a triple <Src,San,Snk>, as previously described. The static analysis tool 150 produces initial security analysis results 157.

It is assumed, in an exemplary embodiment, that the configuration tool 170 causes the computing system 100 to perform at least blocks 215, 220, and 225. In block 215, the computing system 100 performs the operation of, for each security finding t 181 in F' 157, mapping t 181 to its potential configuration-related sources of imprecision (if any) using the mapping M 117. The input to block 215 is the mapping M 117. Examples of rules 185 in mapping 117 are shown in FIG. 3.

Turning to FIG. 3, this figure illustrates three exemplary mapping rules in accordance with an exemplary embodiment. The mapping rules 185 map possible security findings (e.g., in terms of possible security vulnerabilities) to possible configuration-related sources of imprecision. It is noted that the mapping rules 185 are exemplary and are presented in a format useful for ease of exposition. However, the mapping rules 185 are not limited to this exemplary format. Mapping rule 185-1 corresponds to example (A) presented above and has the following exemplary text: "If a vulnerable flow is discovered along a path having a call to a method with a sanitizer-like signature, then a possible configuration-related source of imprecision is the method." As described above, a sanitizer-like signature is accepting a string and returning a string. The possible security finding is a vulnerable flow along a path having a call to a method with a sanitizer-like signature. The possible security vulnerability is that user input (from a source) has not been properly downgraded by a downgrader before being used by a sink. Mapping rule 185-2 corresponds to example (B) presented above and has the following exemplary text: "If a vulnerability of type 'log forging' is discovered, and the source statement is a 'getParameter' call, then a possible configuration-related source of imprecision is the target web container(s)." The possible security finding is a vulnerability of type "log forging" where the source statement is a "getParameter" call. The possible security vulnerability is log forging. Mapping rule 185-3 corresponds to example (C) presented above and has the following exemplary text: "If a vulnerable flow is discovered within framework code, then a possible configuration-related source of imprecision is the framework configuration." The possible security finding is a vulnerable flow within framework code. The possible security vulnerability is a sink using user input (from a source) without proper downgrading. It is noted that the security findings are "possible", e.g., as particular security findings and their corresponding vulnerabilities may not be applicable to a particular program P 107. Similarly, security vulnerabilities are considered possible, as sink may not be susceptible to a particular vulnerability (e.g., if a sanitizer is used in the flow from a source to the sink, but the sanitizer is not known to the static analysis tool 150 and therefore the flow is marked as vulnerable).

The output of block 215 is a mapping 217 of actual security findings found within the program P 107 to potential configuration-related sources of imprecision. In block 220, the computing system 100 selects configuration-related sources of imprecision for a user to configure. The selection may be performed using a number of techniques, including those illustrated by FIGS. 6-8 (described below). The output of block 220 is, in an exemplary embodiment, a subset 221 of the mapping 217.

In block 225, the computing system 100 requests the user configure the selected configuration-related sources of imprecision. In the example presented herein, the UI 180 of a display 176 is used to implement the request in block 225. However, this is merely exemplary and other techniques are possible. Turning to FIG. 4, this figure illustrates a UI 180 (presented on a display 176) and indications 485 on the UI 180 for requesting a user to configure selected configuration-related sources of imprecision. The indications 485 correspond to the mapping rules 185 in FIG. 3.

The indication 485-1 corresponds to mapping rule 185-1 in FIG. 3 and has the following text in this example: "A vulnerable flow has been discovered along a path having a call to MethodX with a sanitizer-like signature; please consider configuring the specification of the method (e.g., if the method is a sanitizer)." In this case, the configuration-related source of imprecision is the MethodX that has a sanitizer-like signature. It is assumed the static analysis tool 150 has a configuration menu (shown as "Configure" 410 in FIG. 4) that allows the user to configure information associated with MethodX, and in this case the specification of the method, where the specification can indicate, e.g., whether the method is a sanitizer and if so for which security vulnerability.

The indication 485-2 corresponds to mapping rule 185-2 in FIG. 3 and has the following text in this example: "A vulnerability of type 'log forging' has been discovered and the source statement is a 'getParameter' call; please consider configuring whether target web containers) can be constrained to certain web container(s)." In this case, the configuration-related source of imprecision is the web container (s). It is assumed the static analysis tool 150 has a configuration menu (shown as "Configure" 410 in FIG. 4) that allows the user to configure information associated with the web container.

The indication 485-3 corresponds to mapping rule 185-3 in FIG. 3 and has the following text in this example: "A vulnerable flow has been discovered within framework code; please consider configuring information related to the framework configuration." In this case, the configuration-related source of imprecision is the framework configuration. It is assumed the static analysis tool 150 has a configuration menu (shown as "Configure" 410 in FIG. 4) that allows the user to configure information associated with the framework configuration.

Returning to FIG. 2, in block 230, the user updates configurations for the selected configuration-related sources of imprecision. FIG. 5 illustrates exemplary actions 585 taken by a user to configure selected configuration-related sources of imprecision in accordance with block 230. The actions 585 correspond to the indications 485 shown in FIG. 4. Action 585-1 corresponds to indication 485-1 and in action 585-1, the user configures a specification of the method (e.g., MethodX in accordance with the example above) with the sanitizer-like signature to indicate the method is a sanitizer. Action 585-2 corresponds to indication 485-2 and in action 585-2, the user constrains the web container(s) to specific container(s). Action 585-3 corresponds to indication 485-3 and in action 585-3, the user configures the specification of the framework validators installed by user to update framework configuration.

Returning to FIG. 2, output of block 230 is a set 231 of updated configurations. Although not shown in FIG. 2, it is noted that the user may be provided with an option of not performing configuration for some of the selected configuration-related sources of imprecision.

In block 235, the computing system 100 updates the security analysis results based on configured configuration-related sources or imprecision. For instance, the progressive security analysis tool 170 can cause the static analysis tool 150 to rerun (block 260) a portion of the static analysis based on the set 231 of updated configurations. Specifically, the flows that are affected by the updated configurations would be reexamined by the static analysis tool 150. Another exemplary option is to compute (e.g., during static analysis in block 205) metadata for reported vulnerabilities, which allows reasoning about the vulnerabilities without having to run the analysis (or a portion thereof) again. The metadata is examined in block 235 to determine whether or not security finding (s) from the security analysis results are no longer considered to be vulnerable based on the updated configuration. Block 235 produces as output the final security analysis results, F, 158. Consider the following non-limiting examples:

1) For example (A), since the user (in action 585-1) has configured specification of MethodX (with the sanitizer-like signature) to indicate the method is a sanitizer, the static analysis tool 150 can take the configured specification into consideration and apply the configured specification to the flow previously marked as vulnerable and having a path that passed through MethodX. Because the configured specification indicates MethodX is a sanitizer, the static analysis tool 150 would remove an indication (as a security finding 181) of a vulnerability from the security analysis results 157 in order to "create" (or update) the final security analysis results 158.

2) For example (B), since the user (in action 585-2) has performed configuration to constrain the web container(s) to specific container(s), the static analysis tool 150 can take the constraint on the web container(s) into consideration and apply the constrained web container(s) to the vulnerability of type "log forging" that was discovered and based on the source statement being a "getParameter" call. Should the constrained web container(s) not be susceptible to a vulnerability of type "log forging" based on a source statement of a "getParameter" call, the static analysis tool 150 would remove an indication (as a security finding 181) of a vulnerability from the security analysis results 157 in order to "create" (or update) the final security analysis results 158.

3) For example (C), since the user (in action 585-3) has performed configuration to configure the specification of framework validators installed by the user to update the framework configuration, the static analysis tool 150 can take the specification of framework validators into consideration and apply the specification of framework validators to the corresponding flows previously indicated as being vulnerable in initial security analysis results 157. Should the flows no longer be susceptible to a vulnerability (e.g., since the flows pass through the framework validators), the static analysis tool 150 would remove indication(s) (as security finding(s) 181) of a vulnerability or vulnerabilities from the security analysis results 157 in order to "create" (or update) the final security analysis results 158.

Thus, in block 250, the computing system 100 determines whether security finding(s) 181 from the security analysis results 157 are no longer considered to be vulnerable based on the updated configuration. Although it is possible for the user to update configuration associated with configuration-related sources of imprecision and the determination in block 250 would determine that all of the previously considered vulnerabilities in the security findings 181 are still considered to be vulnerable based on the updated configuration, it is likely that one or more (typically many) security finding(s) 181 from the security analysis results 157 would be determined to no longer be vulnerable (block 255) and would be removed (block 255) from the initial security analysis results 157 to create final security analysis results 158, which should contain fewer security findings 181.

In block 240, the computing system 100 (e.g., under direction of the static analysis tool 150 or the configuration tool 170) outputs the final security analysis results. For instance, this output could go to memory/memories 145 or could be displayed in whole or part to the user (block 245) using indications of the security findings 181 remaining in the final security analysis results 158.

In a typical static security analysis of a large web program, for instance, there may be hundreds or thousands of indicated security findings 181. Therefore, the number of entries in the mapping 217 of actual security findings to potential configuration-related sources of imprecision could be quite high. Thus, it would be beneficial in many situations to reduce (via selection in block 220 of FIG. 2) the number of configuration-related sources of imprecision the user is asked to configure.

Figure 7:
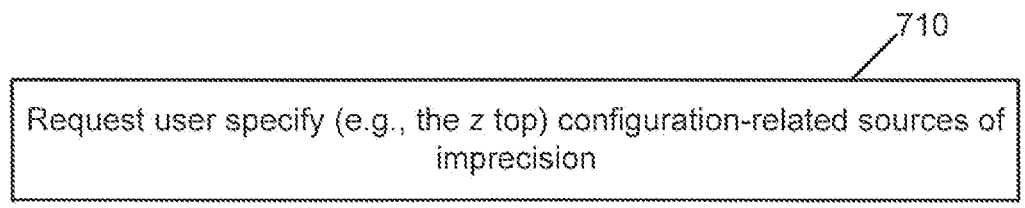
Figure 8:
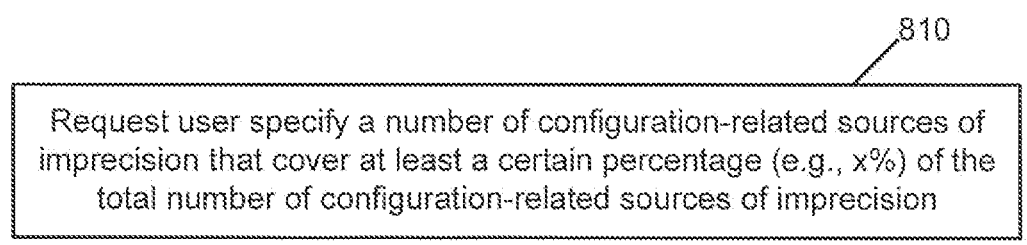

There are a number of different techniques to select the configuration-related sources of imprecision for a user to configure (see block 220 of FIG. 2). FIGS. 6, 7, and 8 are each examples of operations to select configuration-related sources of imprecision for a user to configure. In block 610 of FIG. 6, the computing system 100 (e.g., under control of the configuration tool 170) converges on a subset (less than all) of the configuration-related sources of imprecision that optimizes the following two constraints:

1) Minimum number of configuration-related sources of imprecision; and
2) Maximal precision.

The more precise an analysis is, the fewer false positives there are. These two constraints are in conflict, and so this is an optimization problem, where the solution is to configure the least amount of items yielding the highest accuracy improvement. The exact weights of these two constraints may be decided in an actual implementation and such weights would be taken into account during the optimization problem. An optimization problem with multiple constraints is performed in Livshits, et al., "Merlin: Specification Inference for Explicit information Flow Problems", PLDI '09 Proceedings of the 2009 ACM SIGPLAN conference on Programming language design and implementation (2009).

In block 710 of FIG. 7, the computing system 100 (e.g., under control of the configuration tool 170) requests the user to specify (e.g., the z top) configuration-related sources of imprecision. In block 810 of FIG. 8, the computing system 100 (e.g., under control of the configuration tool 170) requests the user specify a number of configuration-related sources of imprecision that cover at least a certain percentage (e.g., x %) of the total number of configuration-related sources of imprecision.

The techniques in FIGS. 6-8 are merely exemplary and other techniques may be used.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include a propagating wave.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus, comprising:
   one or more memories comprising computer-readable code;
   one or more hardware processors,
   wherein the one or more hardware processors are configured, in response to execution of the computer-readable code, to cause the apparatus to perform the following:
   mapping, based on a first mapping from possible security findings for possible security vulnerabilities in a static analysis of a program to possible configuration-related sources of imprecision, actual security findings in security analysis results from the static analysis of the program to corresponding configuration-related sources of imprecision, the mapping of the actual security findings creating a second mapping;
   selecting configuration-related sources of imprecision, wherein selecting further comprises converging on a subset of the configuration-related sources of imprecision that optimizes the following two constraints: minimum number of configuration-related sources of imprecision; and maximal precision, and wherein selecting further comprises setting the subset of the configuration-related sources of imprecision as the selected configuration-related sources of imprecision;
   requesting a user configure the selected ones of the configuration-related sources of imprecision from the second mapping;
   responsive to a user updating configuration corresponding to the selected ones of the configuration-related sources of imprecision, updating security analysis results for the static analysis of the program at least by determining whether one or more security findings from the security analysis results are no longer considered to be vulnerable based on the updated configuration by the user and by removing from the security analysis results any of the one or more security findings that are no longer considered to be vulnerable based on the updated configuration by the user; and
   outputting the updated security analysis results.

2. The apparatus of claim 1, wherein requesting further comprises outputting indications requesting the user configure the selected configuration-related sources of imprecision.

3. The apparatus of claim 1, wherein:
   the one or more hardware processors are further configured, in response to execution of the computer-readable code, to cause the apparatus to perform the following: prior to mapping actual security findings from a static analysis of the program to corresponding configuration-related sources of imprecision, performing a first static analysis to determine the actual security findings; and
   determining whether one or more security findings from the security analysis results are no longer considered to be vulnerable based on the updated configuration by the user further comprises performing a second static analysis on the program specifically on flows affected by the configuration updated by the user.

4. The apparatus of claim 1, wherein:
   the one or more hardware processors are further configured, in response to execution of the computer-readable code, to cause the apparatus to perform the following: prior to mapping actual security findings from a static analysis of the program to corresponding configuration-related sources of imprecision, performing a first static analysis to determine the actual security findings and to compute metadata for reported vulnerabilities; and
   determining whether one or more security findings from the security analysis results are no longer considered to be vulnerable based on the updated configuration by the user further comprises examining the computed metadata to determine whether one or more security findings from the security analysis results are no longer considered to be vulnerable.

5. The apparatus of claim 1, wherein outputting further comprises outputting the updated security analysis results to a display.

6. A computer program product comprising a non-transitory computer readable storage medium having program code embodied therewith, the program code executable by a computing system causing the computing system to perform:
   mapping, based on a first mapping from possible security findings for possible security vulnerabilities in a static analysis of a program to possible configuration-related sources of imprecision, actual security findings in security analysis results from the static analysis of the program to corresponding configuration-related sources of imprecision, the mapping of the actual security findings creating a second mapping;
   selecting configuration-related sources of imprecision, wherein selecting further comprises converging on a subset of the configuration-related sources of imprecision that optimizes the following two constraints: minimum number of configuration-related sources of imprecision; and maximal precision, and wherein selecting further comprises setting the subset of the configuration-related sources of imprecision as the selected configuration-related sources of imprecision;
   requesting a user configure the selected ones of the configuration-related sources of imprecision from the second mapping;
   responsive to a user updating configuration corresponding to the selected ones of the configuration-related sources of imprecision, updating security analysis results for the static analysis of the program at least by determining whether one or more security findings from the security analysis results are no longer considered to be vulnerable based on the updated configuration by the user and by removing from the security analysis results any of the one or more security findings that are no longer considered to be vulnerable based on the updated configuration by the user; and outputting the updated security analysis results.

7. The computer program product of claim 6, wherein requesting further comprises outputting indications requesting the user configure the selected configuration-related sources of imprecision.

8. The computer program product of claim 6, wherein:
the program code executable by a computing system further causing the computing system to perform: prior to mapping actual security findings from a static analysis of the program to corresponding configuration-related sources of imprecision, performing a first static analysis to determine the actual security findings; and
determining whether one or more security findings from the security analysis results are no longer considered to be vulnerable based on the updated configuration by the user further comprises performing a second static analysis on the program specifically on flows affected by the configuration updated by the user.

9. The computer program product of claim 6, wherein:
the program code executable by a computing system further causing the computing system to perform: prior to mapping actual security findings from a static analysis of the program to corresponding configuration-related sources of imprecision, performing a first static analysis to determine the actual security findings and to compute metadata for reported vulnerabilities; and
determining whether one or more security findings from the security analysis results are no longer considered to be vulnerable based on the updated configuration by the user further comprises examining the computed metadata to determine whether one or more security findings from the security analysis results are no longer considered to be vulnerable.

10. The computer program product of claim 6, wherein outputting further comprises outputting the updated security analysis results to a display.

11. The apparatus of claim 1, wherein the first mapping comprises a plurality of mapping rules that map possible security findings for the static analysis of the program to possible configuration-related sources of imprecision.

12. A method, comprising:
mapping, based on a first mapping from possible security findings for possible security vulnerabilities in a static analysis of a program to possible configuration-related sources of imprecision, actual security findings in security analysis results from the static analysis of the program to corresponding configuration-related sources of imprecision, the mapping of the actual security findings creating a second mapping;
selecting configuration-related sources of imprecision, wherein selecting further comprises converging on a subset of the configuration-related sources of imprecision that optimizes the following two constraints: minimum number of configuration-related sources of imprecision; and maximal precision, and wherein selecting further comprises setting the subset of the configuration-related sources of imprecision as the selected configuration-related sources of imprecision;
requesting a user configure the selected configuration-related sources of imprecision from the second mapping;
responsive to the user updating configuration corresponding to the selected configuration-related sources of imprecision, updating the security analysis results for the static analysis of the program at least by determining whether one or more security findings from the security analysis results are no longer considered to be vulnerable based on the updated configuration by the user and by removing from the security analysis results any of the one or more security findings that are no longer considered to be vulnerable based on the updated configuration by the user; and
outputting the updated security analysis results.

13. The method of claim 12, wherein outputting further comprises outputting the updated security analysis results to a display.

14. The method of claim 12, further comprising, prior to requesting, selecting the selected configuration-related sources of imprecision.

15. The method of claim 12, wherein requesting further comprises outputting indications requesting the user configure the selected configuration-related sources of imprecision.

16. The method of claim 12, wherein:
the method further comprises, prior to mapping actual security findings from a static analysis of the program to corresponding configuration-related sources of imprecision, performing a first static analysis to determine the actual security findings; and
determining whether one or more security findings from the security analysis results are no longer considered to be vulnerable based on the updated configuration by the user further comprises performing a second static analysis on the program specifically on flows affected by the configuration updated by the user.

17. The method of claim 12, wherein:
the method further comprises, prior to mapping actual security findings from a static analysis of the program to corresponding configuration-related sources of imprecision, performing a first static analysis to determine the actual security findings and to compute metadata for reported vulnerabilities; and
determining whether one or more security findings from the security analysis results are no longer considered to be vulnerable based on the updated configuration by the user further comprises examining the computed metadata to determine whether one or more security findings from the security analysis results are no longer considered to be vulnerable.

\* \* \* \* \*